United States Patent [19]

Kamin et al.

[11] 4,015,481
[45] Apr. 5, 1977

[54] BUBBLE BALANCER

[75] Inventors: Arthur Kamin, Mundelein; Clifford A. Evans, Waukegan; Lehner C. Freborg, Libertyville, all of Ill.

[73] Assignee: Ammco Tools, Inc., North Chicago, Ill.

[22] Filed: May 24, 1976

[21] Appl. No.: 689,511

[52] U.S. Cl. ................................................ 73/483
[51] Int. Cl.² .......................................... G01M 1/12
[58] Field of Search ............ 73/482, 483, 484, 485

[56] References Cited

UNITED STATES PATENTS

| | | | |
|---|---|---|---|
| 2,220,404 | 11/1940 | Hulslander | 73/485 |
| 3,492,878 | 2/1970 | Mitchell | 73/485 |

*Primary Examiner*—James J. Gill
*Attorney, Agent, or Firm*—Edmond T. Patnaude

[57] ABSTRACT

A pivot head for a bubble balancer has a socket which receives a spherical support member, the socket having a concave top wall which rests on the spherical member and a circular side wall in close proximity to the equator of the spherical member.

8 Claims, 3 Drawing Figures

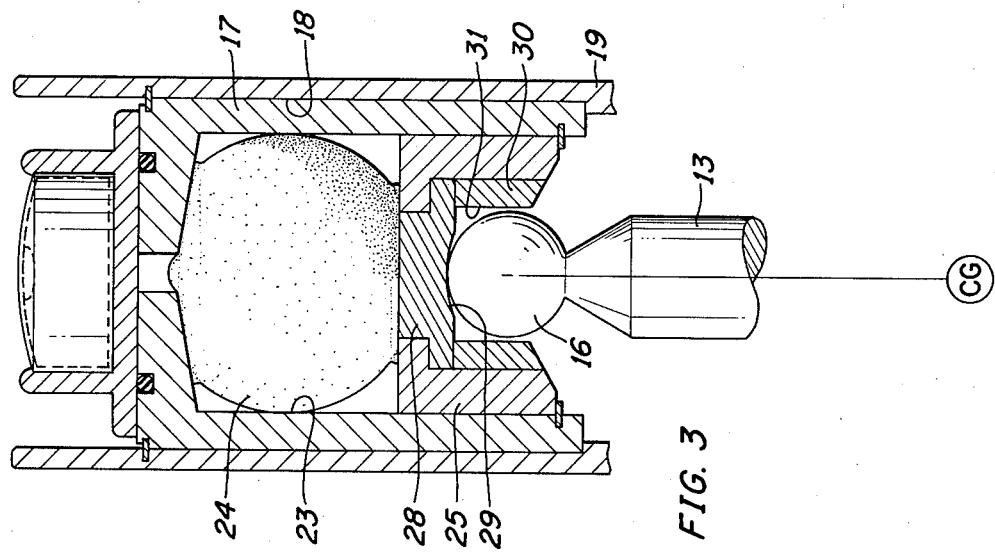
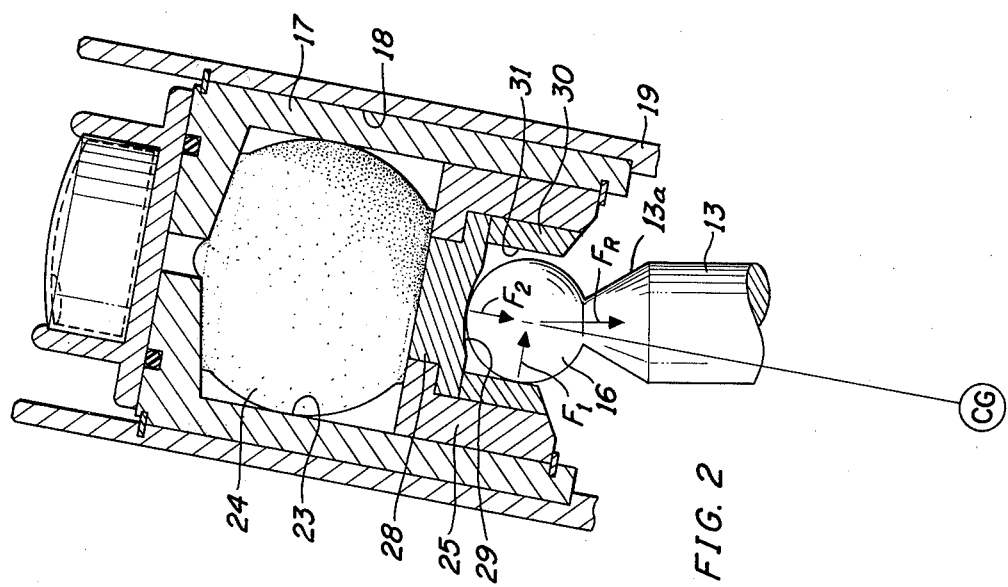

BUBBLE BALANCER

The present invention relates in general to the art of rotor balancing, and it relates in particular to a novel bubble balancer and pivot assembly for balancing wheels and other rotors.

BACKGROUND OF THE INVENTION

For many years bubble balancers have been widely used in automotive service shops for use in statically balancing the wheels of automotive vehicles. Such balancers generally include a pivot head to which the wheel to be balanced is mounted. The pivot head pivotally supports the wheel about a pivot point or area located on the axis of rotation of the wheel above its center of gravity. A 360° spirit level is mounted to the pivot head in parallel relationship to the principal plane of the wheel so that the bubble in the level is centered only when the center of gravity of the wheel lies on the axis of rotation thereof, i.e., directly below the pivot point. When this condition occurs, the principal plane of the wheel is, of course, horizontal.

The prior art bubble balancers have generally utilized a pivot assembly comprising a substantially non-compressible ball and a substantially non-deformable platen. In some designs the platen is fixedly mounted to the top of an upright spindle or other support member and the wheel to be balanced is mounted to the ball which in turn rests on the platen. In other designs the ball is mounted to the top of an upright spindle or other support and the wheel to be balanced is mounted to the platen which in turn rests on the ball. It may thus be seen that with these two most commonly used designs the pivot point is located either at the area of contact between the platen and the top of the ball or between the platen and the bottom of the ball.

An inherent problem with the prior art bubble balancers has been the fact that they do not provide consistently repeatable indications of balance. Theoretically, if the balancer indicates that the wheel mounted thereon is balanced, removal of the wheel from the balancer and the subsequent replacement of the wheel thereon should cause the bubble in the level to return to the central position. All too frequently this is not the case, and neither the cause of the problem nor its solution has heretofore been found.

We believe that there are two principle reasons for the fact that the prior art bubble balancers have not always enabled repeatable balancing operations, and the reasons differ with the two types of pivot assemblies described above.

In those balancers wherein the ball rests on the platen, we have found that a true indication of balance will occur only when the platen surface is perfectly horizontal. Otherwise, the ball tends to roll downhill on the platen and thereby exert a torque on the pivot head causing it to come to rest in a non-horizontal position when the wheel under test is actually in balance. With this condition, rotation of a balanced wheel on the balancer will cause the bubble to move off center. Because of the portable nature of most bubble balancers and the conditions under which they are used, even though adjustment means are commonly provided for initially leveling the balancers, the platens are often times not horizontal during a balancing operation.

In those prior art balancers wherein the platen rests on the ball, the platen surface has been made concave to hold the platen on the ball. Theoretically, if the wheel is mounted with its axis of rotation centered in the recess such a concave surface should assure that the contact area between the ball and the platen lies on the axis of rotation of the wheel being balanced. However, when the wheel being balanced swings into a tilted condition, i.e., the principal plane thereof is not horizontal, the platen moves laterally and down across the surface of the ball thus causing the pivot area to move from the center position in the recess and thus be displaced from the axis of rotation of the wheel. Consequently, as the wheel oscillates or swings back and forth and slowly approaches a stationary horizontal position of balance, the platen does not always recenter itself on the ball inasmuch as there is but a very small component of force tending to cause the platen to move laterally to the critical center position. Yet, such balancers will only function correctly if the pivot area is on the axis of rotation of the wheel. Of course, if the platen has a recess whose radius is the same as that of the ball the platen cannot shift back and forth across the surface of the ball, but the friction between the platen and the ball reduces the accuracy of the balancer below acceptable limits. Another seemingly valid solution to this problem would be to reduce the size of the ball, but crushing or flattening of the ball or platen then becomes a problem of greater concern than non-repeatability.

SUMMARY OF THE INVENTION

Briefly, we have provided in accordance with the present invention a bubble balancer which utilizes a ball and a platen pivot assembly but which, unlike the prior art balancer, using this type of pivot assembly, provides repeatable measurements of balance. Our balancer incorporates a spherical support surface positioned in a socket having a concave top wall which rests on the spherical surface and a circular side wall closely adjacent the equator of the spherical surface. A very small clearance of about 0.002 inch is provided between the circular side wall of the socket and the equator of the spherical support surface to hold the top socket surface closely centered on the spherical support surface as the wheel to be balanced swings back and forth during a balancing operation. This small clearance insures that the side wall will contact the spherical surface when the head tilts through a very small angle of about 3°. When the wheel being balanced is in a tilted condition the top wall and the circular side wall of the socket respectively abut the spherical support surface at positions spaced 90° apart. The resultant vector force is thus through the center of generation of the spherical surface and it is the center of the spherical surface about which the wheel being balanced pivots. As a consequence, the pivot point remains at the center of the spherical member on the axis of rotation of the wheel and thus does not move laterally as the wheel swings back and forth. Moreover, as a swinging wheel approaches the horizontal position of balance, the force exerted by the circular side wall of the socket together with the force of gravity causes the socket to self center on the spherical surface whereby the circular side wall is spaced from the equator of the spherical support surface. This provides increased sensitivity at the balanced position because of the reduced friction and also assures that the pivot point is on the axis of rotation of the wheel. It will also be apparent that the area of contact between the circular side wall of the socket and the spherical support member provides some damping when the wheel is swinging or oscillating during the balancing operation.

BRIEF DESCRIPTION OF THE DRAWINGS

Further objects and advantages and a better understanding of the present invention can be had by reference to the following detailed description, wherein:

FIG. 2 is an enlarged sectional view showing the pivot head of FIG. 1 in a tilted position; and FIG. 3 is an enlarged sectional view showing the pivot head of FIG. 1 in a horizontal position.

DETAILED DESCRIPTION OF THE INVENTION

Figure 1:
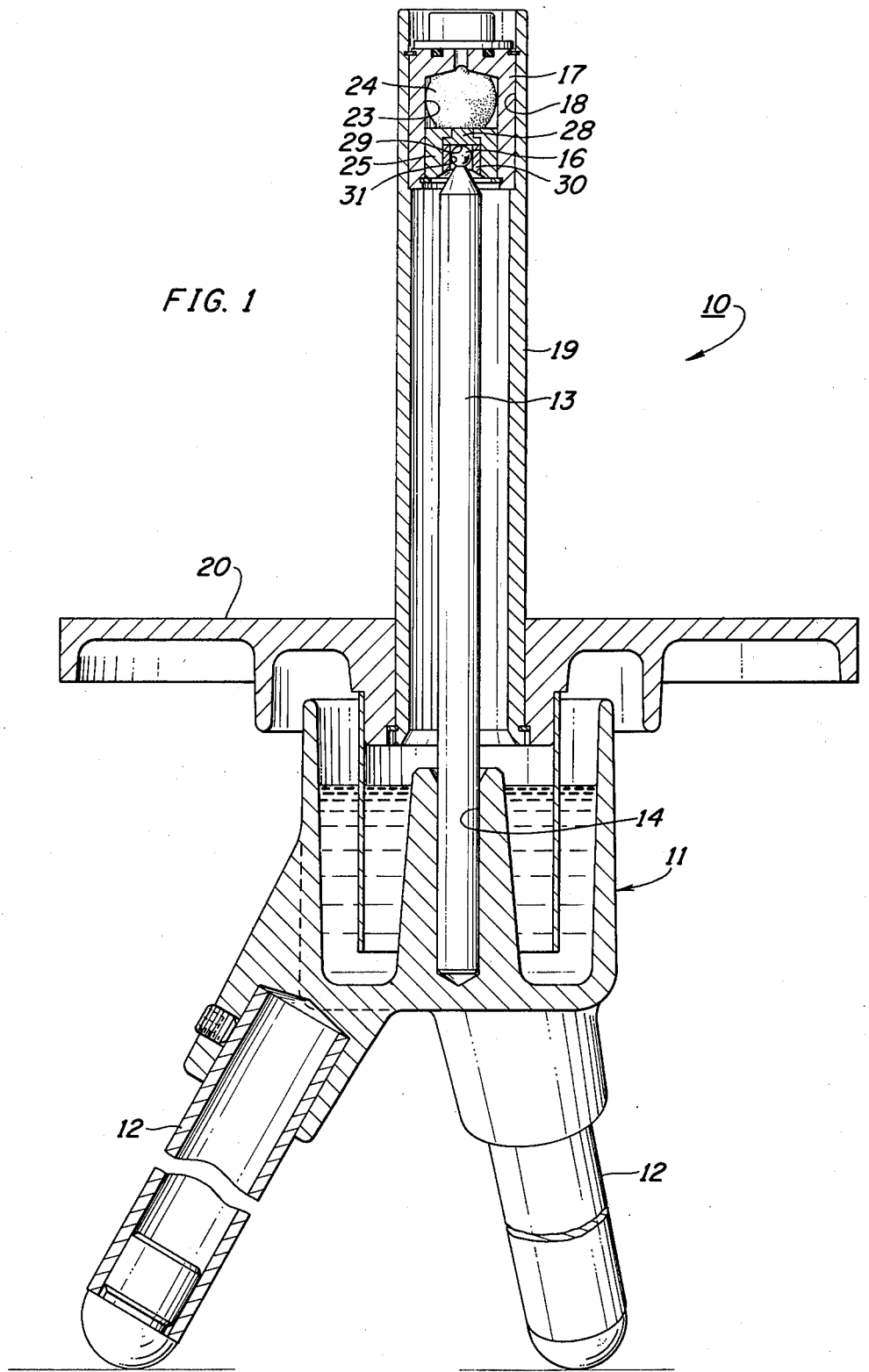
FIG. 1 is an elevational view, partly in cross section, of a bubble type static wheel balancer embodying the present invention.

Referring particularly to FIG. 1, a wheel balancer 10 comprises a base 11 including three legs 12 (only two are visible in the drawing) and an upright spindle or support post 13 which fits in an elongated recess 14 in the base 11. The upper end of the spindle 13 is inwardly tapered at 13a above which a spherical surface or ball member 16 which supports a pivot head 17 is provided. The member 16 has an exposed spherical surface which is substantially greater than 180° in the vertical direction to permit the head 17 to tilt freely through a substantial angle during the balancing operation. In the preferred embodiment of the invention shown in FIGS. 2 and 3, the spherical surface exceeds 270° in the vertical direction.

The pivot head 17 is tightly mounted in a counter bore 18 in the upper end of a tubular member 19 to which a wheel support platen 20 is mounted. A wheel (not shown) to be balanced is positioned over the tube 19 and rests on the platen surface 20. Suitable means such as a centering cone is used to accurately align the axis of rotation of the wheel with the central longitudinal axis of the tube 19. As more fully described hereinafter the central longitudinal axis of the spindle 13 intersects the center of generation of the spherical surface 16. The surface 16 may be provided on a solid ball welded to the tapered upper end of the spindle 13 or may be an integral part of the spindle.

The pivot head 17 is provided with a downwardly opening bore 23 in which a resilient ball 24 formed of rubber or other elastomeric material is disposed. A support cylinder 25 is slidably mounted in the bore 23 beneath the ball 24 and is provided therein with a downwardly opening socket in which the spherical pivot surface 16 is located. More particularly and with reference to FIGS. 2 and 3, this socket is provided by a top member 28 having a centrally disposed spherical recess 29 in the bottom surface thereof and a tubular cylindrical member 30 which provides an internal circular side wall 31. The internal diameter of the circular wall 31 is but slightly larger than the external diameter of the spherical surface 16. It is important that this clearance be relatively small, and a total clearance of 0.022 inch has been found to work properly with a surface 16 having a radius of 0.250 inch.

The axis of generation of the cylindrical surface 31 coincides with the central vertical axis of the shallow recess 29 so that when the ball or surface 16 is in the position shown in FIG. 2 wherein it engages both the side wall 31 and the top wall 29 the two forces exerted on the ball from the socket are vectors intersecting the center point of the sphere 16. As a result, as the pivot head 17 rocks back and forth as the wheel swings to and fro in a normal balancing operation, the pivot point remains at the center of the sphere 16 and is not at the area of contact between the sphere 16 and the platen surface. In FIG. 2 the two vector forces are identified at $F_1$ and $F_2$ with the resultant force $F_R$ extending from the center of sphere 16 in a true vertical direction.

In FIG. 2 the center of gravity of the wheel and the parts to which it is mounted including the platen 20, the tube 19 and the pivot head is at the location marked CG. As the head swings counterclockwise as viewed in FIG. 2 it will move into the position shown in FIG. 3 wherein the center of gravity is directly below the center of the spherical surface 16. It may thus be seen that as the pivot head moves from the position illustrated in FIG. 2 to that illustrated in FIG. 3 the force component $F_1$ causes the pivot head to move laterally a distance of one-half the total clearance between the surfaces 16 and 31 so that the spherical surface 16 is spaced in all directions from the cylindrical wall 31. Also, of course, this means that the center of gravity is directly below the center of the sphere 16. We have found that with this pivot head assembly extremely precise repeatable results are obtainable. The radius of the concave surface 29 is about three times or more the radius of the sphere 16. This aids in the self centering of the socket on the sphere 16. We have found, however, that merely providing the concave recess without the cylindrical side wall 31 does not insure that the head will self center on the spherical member and therefore repeatable results are not always achieved.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What we claim is:

1. Apparatus for use in determining the condition of balance of a rotor, comprising in combination,
    an upright support member,
    the upper end portion of said support member having the shape of a portion of a sphere,
    said portion exceeding 180° in the vertical direction,
    a pivot head having means thereon for mounting a rotor to be balanced,
    said pivot head having a downwardly opening recess defined by an annular side wall and a top wall,
    said upper end portion of said support member being disposed in said recess in engagement with said top wall,
    the respective dimensions of said sphere and said annular side wall being such that when said pivot head is tilted about 3° relative to the vertical said end portion of said support member may simultaneously engage said annular and top walls at respective locations on said end portion angularly displaced by substantially 90° in the vertical direction.

2. Apparatus according to claim 1 wherein said top wall has a centrally disposed spherical recess having a radius of curvature substantially greater then the radius of curvature of said upper end portion of said support member.

3. Apparatus according to claim 1 wherein said annular wall is cylindrical.

4. Apparatus according to claim 1 wherein said upright support member comprises
a rod, and
a partially spherical surface disposed at the upper end of said rod.

5. Apparatus according to claim 4 wherein
said spherical surface encompasses at least 270° in the vertical direction.

6. Apparatus according to claim 5 wherein the upper end of
said rod is inwardly tapered below said spherical surface to permit said head to tilt without engaging said rod.

7. Apparatus according to claim 1 wherein said pivot head comprises,
a generally tubular member having a cylindrical bore therein,
a first member fitted in said bore and having a lower surface providing said top wall, and
a tubular cylindrical member press-fitted in said bore below said first member,
said tubular cylindrical member providing said annular side wall.

8. Apparatus according to claim 7 wherein said pivot head further comprises
a member having a downwardly opening recess therein,
an elastomeric member disposed in said recess, and
said generally tubular member being slidably mounted in said recess below said elastomeric member.

* * * * *